J. F. HUME.
WRITING IMPLEMENT.
APPLICATION FILED MAR. 8, 1921.
1,438,114.
Patented Dec. 5, 1922.
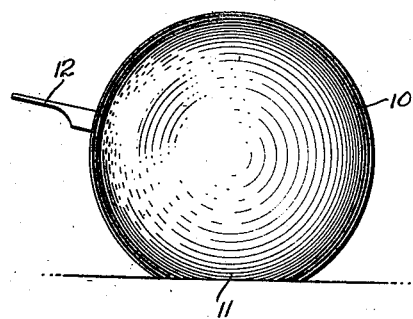
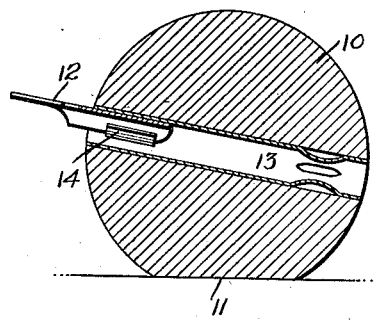
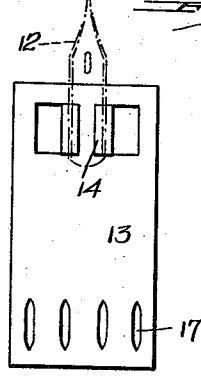
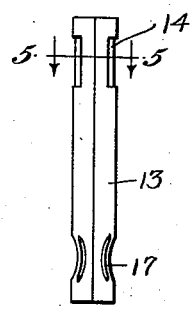
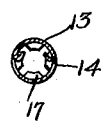
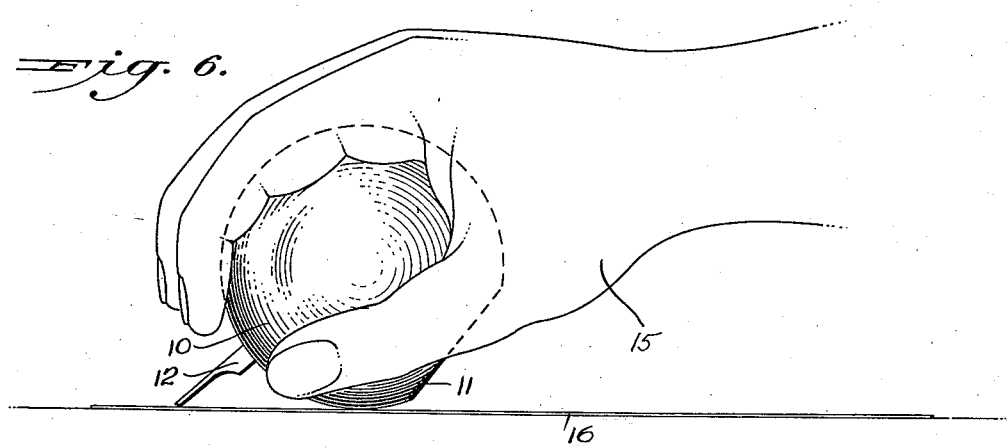
INVENTOR
JESSIE F. HUME Patented Dec. 5, 1922.

1,438,114

UNITED STATES PATENT OFFICE.

JESSIE FREMONT HUME, OF NEW YORK, N. Y.

WRITING IMPLEMENT.

Application filed March 8, 1921. Serial No. 450,563.

*To all whom it may concern:*

Be it known that I, JESSIE FREMONT HUME, a citizen of the United States, and resident of the city of New York, Astoria, in the borough of Queens, county of Queens, and State of New York, have invented a new and Improved Writing Implement, of which the following is a full, clear, and exact description.

My invention relates to a writing implement, and aims to provide certain new and useful improvements in connection with a device of this character.

It is well understood that in teaching children to write, the rules in the majority of all boards of education require that the child's hand be spaced from the surface upon which the writing or drawing is to be effected, the pen or pencil used being the only element in contact with the writing surface.

Obviously this exerts a marked strain upon the muscles of the arm and wrist, and it is thus very difficult for the child to maintain the position required without fatigue for any length of time.

With these facts in view I have constructed a writing implement by means of which writing or drawing may be effected with ease, and with much greater celerity than is at present possible.

My invention is particularly devised with a view of providing an implement capable of utilization by school children, but not necessarily limited to this adaptation.

Reference is had to the attached sheet of drawings as illustrating one practical embodiment of my invention, and in which;

Figure 1 is a side view of a writing implement constructed in accordance with my invention, and showing the same in the position which the parts assume when not in use.

Figure 2 is a sectional side view of the implement.

Figures 3, 4, 5 illustrate various details of construction permitting of the association of a pen with my implement, and Figure 6 is a view similar to Figure 1 but showing the implement in use.

It is to be noted, that in the embodiment illustrated, I have shown in each instance a pen associated with a device, together with structure permitting of a retention of this point, but it will be appreciated that any customary type of writing or drawing appliance might be equally as well associated with the implement, the essence of my invention residing in the structure of the latter.

Referring now to Figures 1 and 6 it will be noted that this implement includes a spherical body 10 of any desirable material, which preferably has a portion of its face flat to provide a surface 11, permitting of the implement being laid aside by the user thereof, without any danger of the same subsequently shifting its position, as has been indicated in Figure 1.

Associated with the body 10 is any desirable type of writing or drawing element, such as a pen 12, which has its point extending beyond the face of the body 10. To retain the pen 12 suitably in this position the body of the implement may be formed with a transversely extending bore into which a sleeve 13 is fitted, this sleeve providing instruck portions 14 forming a socket capable of the reception of the rear end of the pen 12.

The pen may now be dipped into writing fluid, and upon the implement being moved to the position indicated in Figure 6 it will be noted that the hand 15 may be retained in its proper position, i. e. spaced from the writing surface 16, the face of the body 10 acting as a bearing, presenting a minimum of frictional contact with the writing surface 16, thus permitting freedom of sliding motion on the part of the implement, and acting as a rest for the hand and arm of the user, the palm of the hand at the base of the middle fingers pressing upon the writing implement, thus relieving the muscles of any undue amount of strain.

When the writer is through utilizing the implement, the same may be simply brought to a position in which its flat face 11 rests upon a supporting surface, it being obvious that any rolling of the implement will thus be precluded as in Figure 2.

Also it will be noted that an implement constructed in accordance with my invention is capable of receiving either a pen point or a pencil, it being noted in connection with the latter statement, that the sleeve 13 is formed with inwardly bent portions 17 adjacent the end opposite to the instruck portions 14, and these inwardly bent portions 17 are capable of frictionally engaging a pencil so as to permit of the use of the same in association with my implement.

Obviously, any desirable type of writing or drawing element may be associated with the implement and the structure of the latter may be varied within the scope of my claim without departing from the spirit of my invention, which I claim as:

A writing implement, including a spherical body formed with a transverse bore and sleeve adapted to be positioned within said bore and means associated with said sleeve and adjacent the end thereof for permitting of a writing element being attached thereto.

JESSIE FREMONT HUME.